(12) United States Patent
Hengstler et al.

(10) Patent No.: US 7,304,285 B2
(45) Date of Patent: Dec. 4, 2007

(54) METHOD AND SYSTEM FOR SHAPING A SPATIAL RESPONSE OF A SPATIAL FILTER

(75) Inventors: Stephan Hengstler, Campbell, CA (US); Ramakrishna Kakarala, Santa Clara, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 10/993,938

(22) Filed: Nov. 19, 2004

(65) Prior Publication Data

US 2006/0108503 A1    May 25, 2006

(51) Int. Cl.
- *G01J 1/44* (2006.01)
- *G01J 3/50* (2006.01)
- *G06K 9/00* (2006.01)
- *G06K 9/62* (2006.01)
- *G01N 21/00* (2006.01)

(52) U.S. Cl. .............. 250/206; 250/226; 382/181; 382/209; 356/435

(58) Field of Classification Search ............ 250/206, 250/208.2, 226, 559.3, 559.4, 548, 208.1; 356/446, 454, 435; 345/163, 166; 382/181, 382/145, 209, 247, 260
See application file for complete search history.

(56) References Cited

U.S. PATENT DOCUMENTS

| | | | |
|---|---|---|---|
| 5,900,949 A | | 5/1999 | Sampas |
| 6,031,218 A | * | 2/2000 | Piot et al. ............ 250/208.2 |
| 6,369,389 B1 | * | 4/2002 | Berlad et al. .......... 250/363.07 |

FOREIGN PATENT DOCUMENTS

EP        0 568 478 A1    11/1993

* cited by examiner

*Primary Examiner*—Georgia Epps
*Assistant Examiner*—Don Williams (57) ABSTRACT

A spatial filter includes a number of photodetectors that generate individual signals in the time domain. The individual signals are subsequently divided and grouped to create the I and Q channels output from the spatial filter. Prior to the formation of the I and Q channels, a window function is used to shape the spatial response of the spatial filter.

18 Claims, 6 Drawing Sheets

METHOD AND SYSTEM FOR SHAPING A SPATIAL RESPONSE OF A SPATIAL FILTER

BACKGROUND

A window function is commonly applied to a signal in order to change the spectrum of the signal. A window function may be used, for example, to suppress side lobes in the spectrum of a signal. Some window functions, such as Blackman, Hanning, and Hamming, have predetermined shapes. Other window functions, including Kaiser, have adjustable or user-defined shapes.

Figure 1:
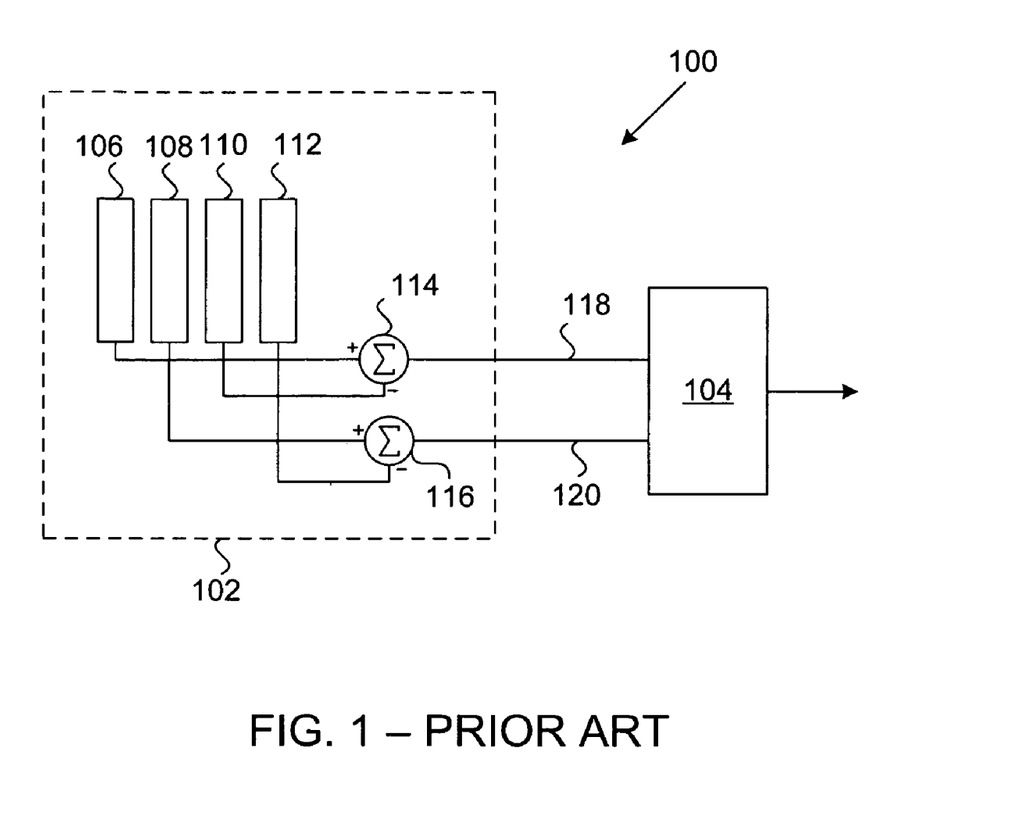
FIG. 1 is a diagrammatic illustration of windowing system according to the prior art.

FIG. 1 is a diagrammatic illustration of windowing system according to the prior art. Windowing system 100 includes spatial filter 102 and window function 104. Spatial filter 102 includes a repeating pattern of photodetectors 106, 108, 110, 112. Photodetectors 106, 108, 110, 112 generate individual signals that are grouped and summed 114, 116 to create signals 118, 120, respectively. Signal 118 is typically known as the in-phase (I) channel and signal 120 as the quadrature (Q) channel.

The I and Q channels may have indistinct frequencies, noise, and drop-outs. These factors can make it difficult to interpret the information contained in the I and Q channels. Window function 104 is therefore applied to the channels in order to modify the spectrum of the signals and improve their resolution.

SUMMARY

In accordance with the invention, a method and system for spatial windowing are provided. A spatial filter includes a number of photodetectors that generate individual signals in the time domain. The individual signals are subsequently divided and grouped to create the I and Q channels output from the spatial filter. Prior to the formation of the I and Q channels, a window function is used to shape the spatial response of the spatial filter.

BRIEF DESCRIPTION OF THE DRAWINGS

The invention will best be understood by reference to the following detailed description of embodiments in accordance with the invention when read in conjunction with the accompanying drawings, wherein.

DETAILED DESCRIPTION

The following description is presented to enable one skilled in the art to make and use embodiments in accordance with the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein.

Figure 2:
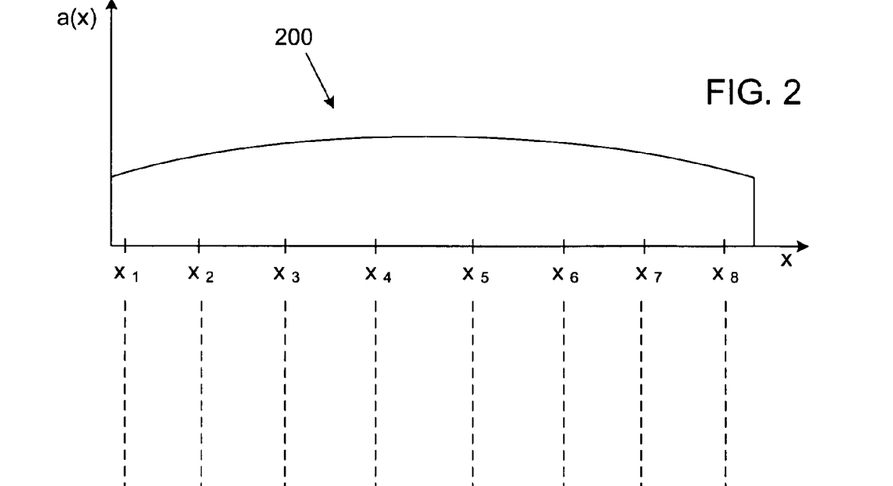
FIG. 2 is a graph of a window function in an embodiment in accordance with the invention.

With reference to the figures and in particular with reference to FIG. 2, there is shown a graph of a window function in an embodiment in accordance with the invention. The shape of window function 200 is created by a series of photodetectors designed to approximate window function 200 and to shape a spatial response of a spatial filter. Techniques for shaping the spatial response of one or more spatial filters are described in more detail in conjunction with FIGS. 3 and 4-8.

Figure 3:
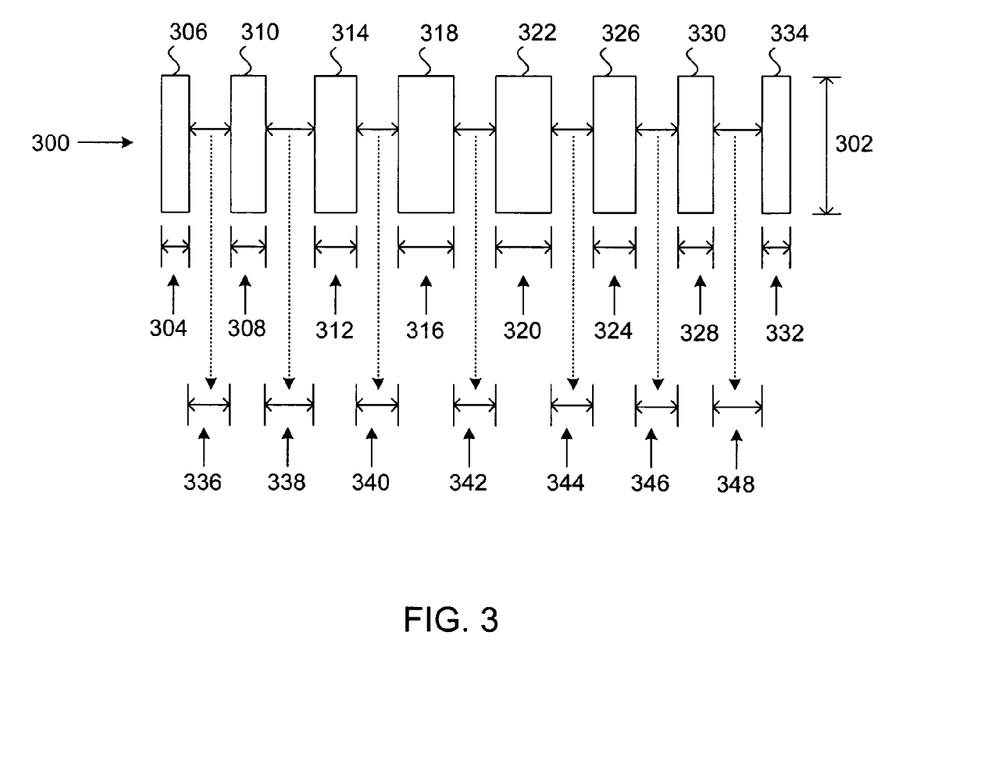
FIG. 3 is a diagrammatic illustration of a series of detectors in an embodiment in accordance with FIG. 2.

FIG. 3 is a diagrammatic illustration of a series of photodetectors in an embodiment in accordance with FIG. 2. The series of photodetectors 300 approximate the window function of FIG. 2. A spatial filter that is designed with photodetectors 300 has N=2, where N represents the number of repetitions for a series of four photodetectors. Although FIG. 3 depicts the photodetectors in a rectangular shape, other embodiments in accordance with the invention are not limited to this configuration. The photodetectors in a spatial filter may be implemented with any shape, such as, for example, a square or oval.

Each photodetector has been formed with a physical area designed to produce a signal level proportional to a respective window coefficient. In the embodiment of FIG. 3, the height 302 of the photodetectors is fixed while the width of each photodetector is adjusted to produce the desired physical area. In another embodiment in accordance with the invention, the width of the photodetectors is fixed while the height of one or more photodetectors is adjusted. In yet another embodiment in accordance with the invention, both the height and width of one or more photodetectors are adjusted pursuant to a particular window function. And finally, in another embodiment in accordance with the invention, the physical area of one or more photodetectors is adjusted independent of the other detectors such that the height of some or all of the detectors is different from the others, the width of some or all of the detectors is different from the others, or both the height and width of some or all of the detectors are adjusted independently from the others.

The width 304 of photodetector 306 is determined by $a(x_1)W$, where $a(x_1)$ represents a window coefficient and W a fixed baseline width. Multiplying width 304 by the window coefficient $a(x_1)$ adjusts the physical area of photodetector 306 such that photodetector 306 generates the spatial window function at point $x_1$ (see FIG. 2). The width 308 of photodetector 310 is defined by $a(x_2)W$, where $a(x_2)$ represents a different window coefficient from $a(x_1)$. The value $a(x_2)W$ determines the physical area of photodetector 310 such that detector 310 produces the spatial window function at point $x_2$.

The width 312 of photodetector 314 is determined by $a(x_3)W$, where $a(x_3)$ represents another window coefficient. Again, the window coefficient $a(x_3)$ produces an area for photodetector 314 that generates the spatial window function at point $x_3$. Similarly, widths 316, 320, 324, 328, 332 of photodetectors 318, 322, 326, 330, 334, respectively, are governed by the equations $a(x_4)W$, $a(x_5)W$, $a(x_6)W$, $a(x_7)W$, $a(x_8)W$. The window coefficients $a(x_4)$, $a(x_5)$, $a(x_6)$, $a(x_7)$, $a(x_8)$ all produce physical areas that generate the spatial window function at points $x_4$ through $x_8$, respectively. Thus, by varying the physical areas of photodetectors 306, 310, 314, 318, 322, 326, 330, 334, the detectors collectively produce window function 200.

The distances 336, 338, 340, 342, 344, 346, 348 between photodetectors 306, 310, 314, 318, 322, 326, 330, 334, respectively, are equal in the embodiment of FIG. 3. In other embodiments in accordance with the invention some or all of distances 336, 338, 340, 342, 344, 346, 348 are not equal. Thus, the physical area of photodetectors 306, 310, 314, 318, 322, 326, 330, 334, distances 336, 338, 340, 342, 344, 346, 348, or both may be determined by a particular window function designed to produce a desired spatial response from a spatial filter. The areas of detectors 306, 310, 314, 318, 322, 326, 330, 334 and distances 336, 338, 340, 342, 344, 346, 348 are formed using, for example, complementary metal oxide semiconductor (CMOS) fabrication techniques.

Figure 4:
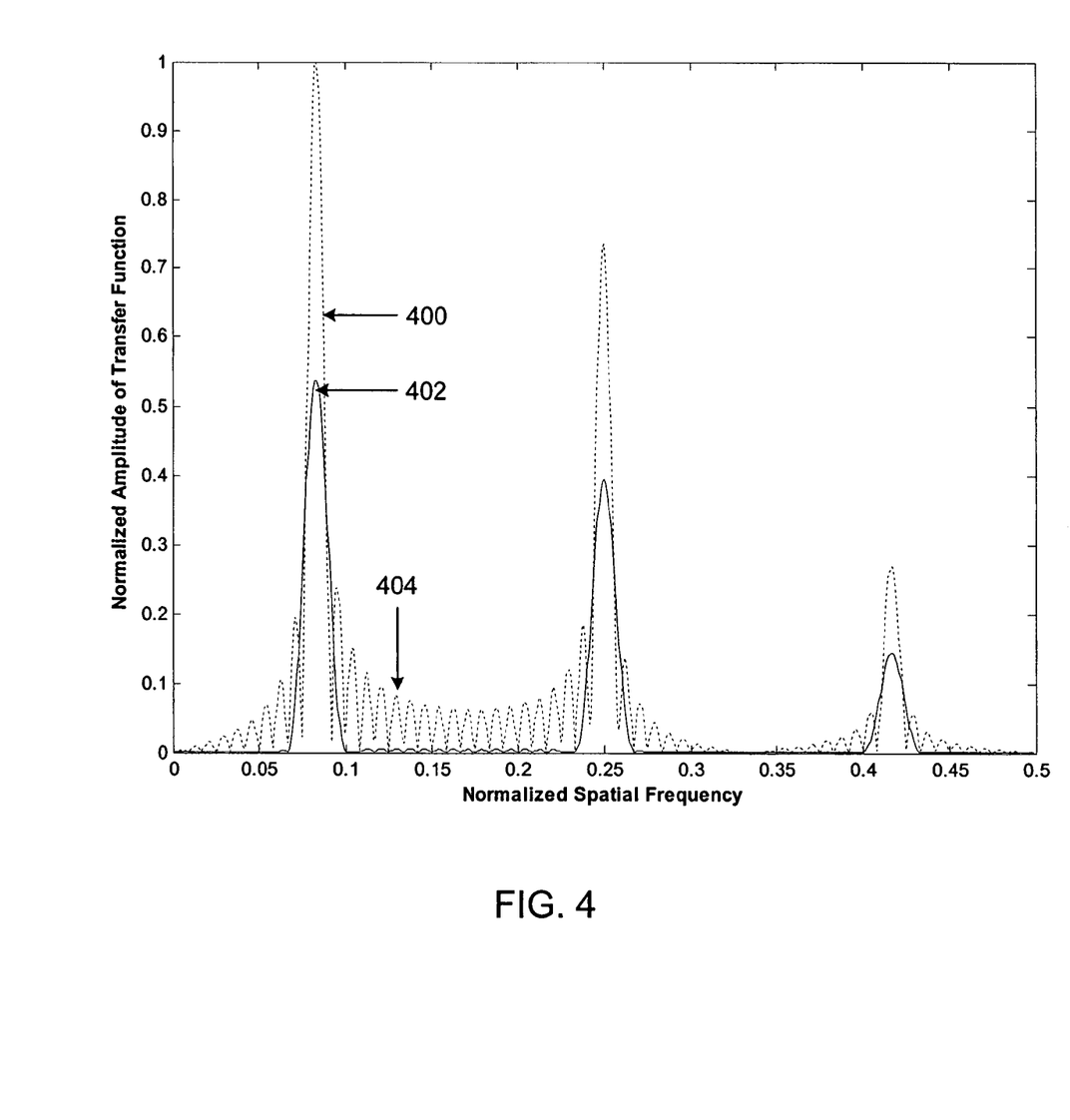
FIG. 4 is a graph of a spatial response of a spatial filter without windowing and a graph of a spatial response of a spatial filter with windowing in an embodiment in accordance with the invention.

Referring to FIG. 4, there is shown a graph of a frequency response curve of a spatial filter without windowing and a graph of a frequency response curve of a spatial filter with windowing in an embodiment in accordance with the invention. Frequency response curve 400 was generated without spatial windowing. Frequency response curve 402 was generated by a spatial filter having photodetector areas proportional to a Hamming window function. As shown in FIG. 4, frequency response curve 402 has a broader main lobe and suppressed side lobes 404 compared with curve 400. The reduced side lobes of frequency response curve 402 suppress noise and make detection of a sinusoidal component in the I and Q channels easier.

A spatial filter designed with the series of photodetectors shown in FIG. 3 has the largest physical detector areas in the center of the filter (detectors 318, 322). The widths of adjacent detectors 314, 326, 310, 330, 306, 334 become smaller as the detectors move away from the center, thereby tapering the fall off of the frequency response of the filter. In another embodiment in accordance with the invention, the fall off may be tapered differently from that of FIG. 3. Moreover, the largest detector areas may include any number of detectors positioned anywhere within the spatial filter.

Thus, in other embodiments in accordance with the invention, the physical area of one or more photodetectors may be determined pursuant to different types of window functions. When designing a spatial filter, the desired shape of a spatial response for the spatial filter is determined by the selection of a window function. For example, window functions such as Blackman, Hanning, and user-defined window functions may be used in other embodiments in accordance with the invention.

Figure 5:
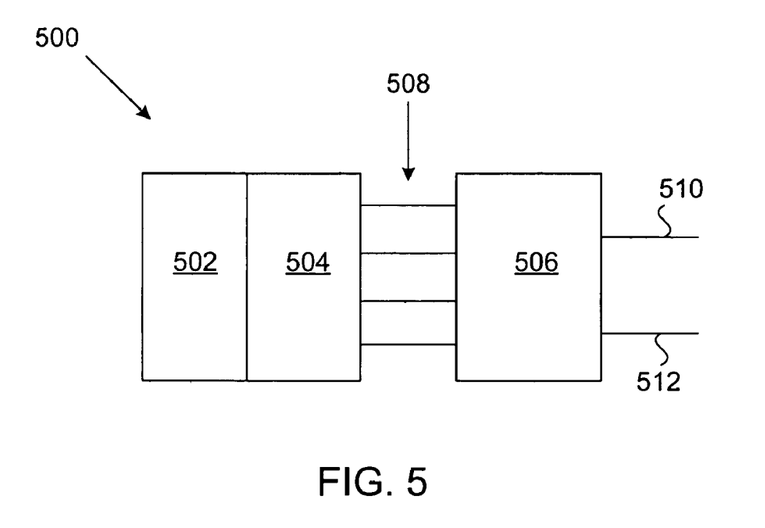
FIG. 5 is a block diagram of a first spatial filter construction in an embodiment in accordance with the invention.

Referring to FIG. 5, there is shown a block diagram of a first spatial filter construction in an embodiment in accordance with the invention. Spatial filter 500 includes detector block 502 and blocking pattern 504. Detector block 402 includes four photodetectors in the embodiment of FIG. 5.

Blocking pattern 504 prevents light from striking some of the surface, or the entire surface, of one or more photodetectors in detector block 502. Blocking all or some of the surface reduces the amount of signal generated by a photodetector. The blocking pattern is designed such that the amount of signal generated by each photodetector is proportional to a particular window coefficient for that photodetector. The shape of the spatial response of spatial filter 500 is determined with the signals generated by the combination of detector block 502 and blocking pattern 504. Blocking pattern 504 includes a metal plate fabricated onto a portion of a surface, or the entire surface, of one or more photodetectors in one embodiment in accordance with the invention. In other embodiments in accordance with the invention, blocking pattern 504 includes any type of opaque mask overlying a portion of the surface, or the entire surface, of one or more photodetectors.

The signals generated by each photodetector in detector block 502 are transmitted to summing block 506 via signal lines 508. Summing block 506 groups the individual signals and generates the I and Q signals on lines 512, 514, respectively. Although FIG. 5 has been described with four photodetectors and one set of I and Q channels, other embodiments in accordance with the invention may include any number of photodetectors that generate the desired number of I and Q channels.

Figure 6:
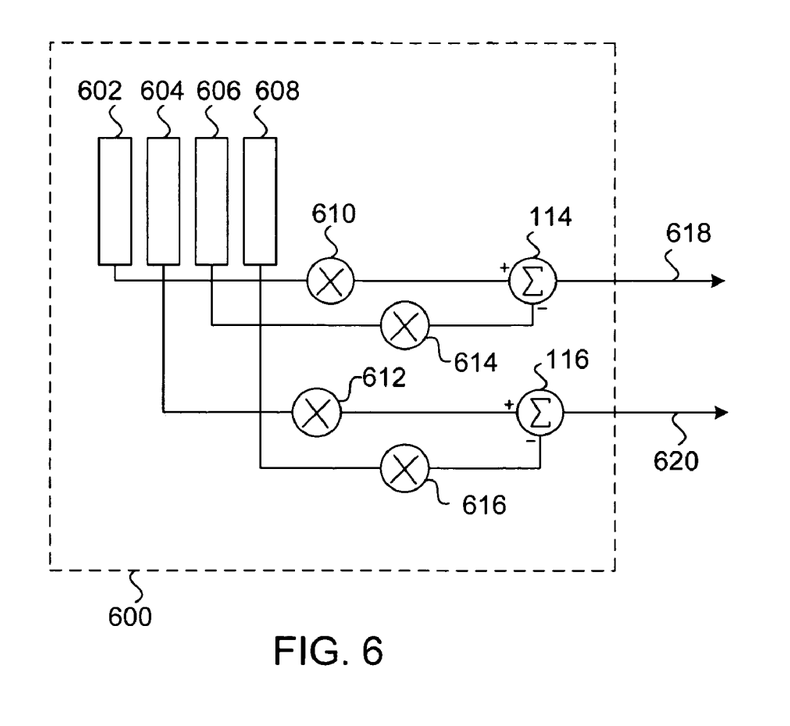
FIG. 6 is a diagrammatic illustration of a second spatial filter construction in an embodiment in accordance with the invention.

FIG. 6 is a diagrammatic illustration of a second spatial filter construction in an embodiment in accordance with the invention. Spatial filter 600 includes photodetectors 602, 604, 606, 608 and summing circuits 114, 116 from FIG. 1. Photodetectors 602, 604, 606, 608 may have the same physical area for detecting light or have areas that are sized independent of each other. And the physical shape of each photodetector 602, 604, 606, 608 may assume any desired shape, including, but not limited to, a square, rectangle, and oval.

Each signal generated by photodetectors 602, 604, 606, 608 is multiplied by a particular window coefficient via analog multiplying circuits 610, 612, 614, 616, respectively. The windowed signals are then grouped and summed by summing circuits 114, 116 to generate the I and Q channels on lines 618, 620 respectively. The values of the window coefficients associated with multiplying circuits 610, 612, 614, 616 depend upon the desired shape of the spatial response of spatial filter 600 and the type of window function used to shape the spatial response.

Figure 7:
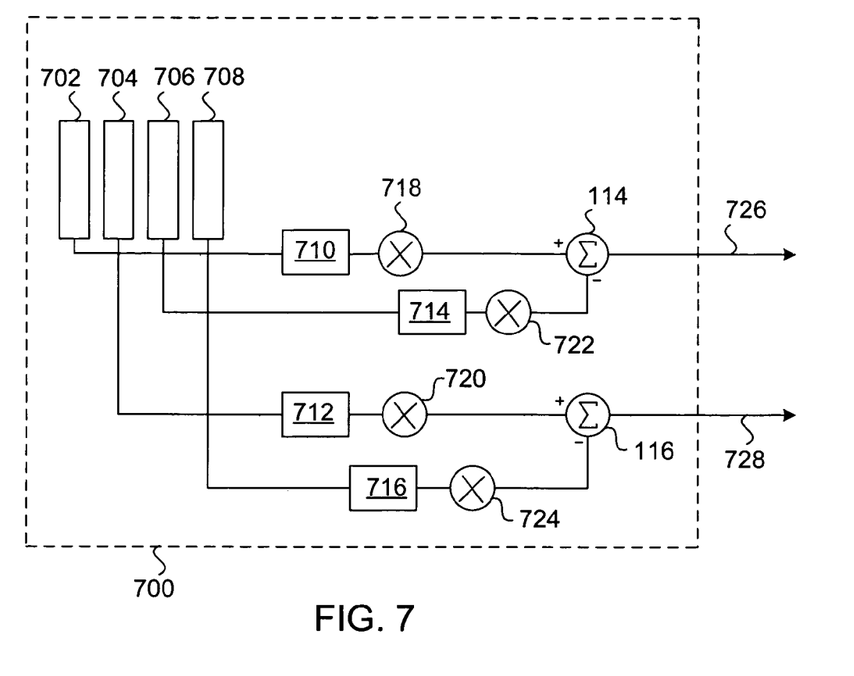
FIG. 7 is a diagrammatic illustration of a third spatial filter construction in an embodiment in accordance with the invention.

Referring to FIG. 7, there is shown a diagrammatic illustration of a third spatial filter construction in an embodiment in accordance with the invention. Spatial filter 700 includes photodetectors 702, 704, 706, 708 and summing circuits 114, 116 from FIG. 1. Photodetectors 702, 704, 706, 708 may have the same physical area for detecting light or have areas that are sized independent of each other. And the physical shape of each photodetector 702, 704, 706, 708 may assume any desired shape, including, but not limited to, a square, rectangle, and oval.

Each signal generated by photodetectors 702, 704, 706, 708 is converted to a digital signal by analog-to-digital converters 710, 712, 714, 716, respectively. The digital signals are then multiplied by a particular window coefficient via digital multiplying circuits 718, 720, 722, 724. The values of the window coefficients associated with multiplying circuits 718, 720, 722, 724 depend upon the desired shape of the spatial response of spatial filter 700 and the type of window function used to shape the spatial response. The windowed signals are then grouped and summed by summing circuits 114, 116 to generate the I and Q channels on lines 726, 728 respectively.

Figure 8:
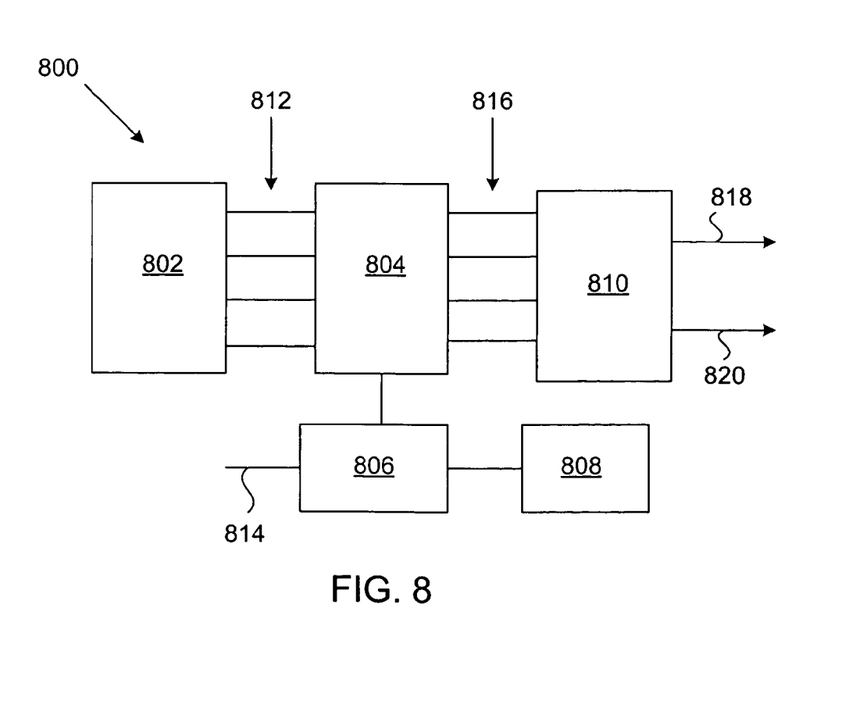
FIG. 8 is a block diagram of a first programmable windowing system in accordance with the embodiments of FIG. 6 and FIG. 7.

FIG. 8 is a block diagram of a first programmable windowing system that may be used in accordance with the embodiments of FIG. 6 and FIG. 7. Programmable windowing system 800 includes photodetector block 802, multiplying block 804, programming block 806, memory 808, and summing block 810. Photodetector block 802, multiplying block 804, programming block 806, memory 808, and summing block 810 are fabricated together in one embodiment in accordance with the invention. One or more of the blocks, however, may be fabricated separately or as discrete components in other embodiments in accordance with the invention.

The individual signals generated by each photodetector in detector block 802 are transmitted to multiplying block 804 via lines 812. Multiplying block 804 multiplies one or more of the signals by a respective window coefficient. The signals may be converted to digital signals prior to the application of the window coefficients.

The window coefficients are input into multiplying block 804 by programming block 806. In one embodiment in accordance with the invention, one or more window coefficients are input into programming block 806 via signal line 814. In another embodiment in accordance with the invention, window coefficients are stored in memory 808. Programming block 806 reads one or more of the window coefficients out of memory 808 and programs multiplying block 804. Signal line 814 and memory 808 allow the window coefficients in multiplying block 804 to be programmed and reprogrammed with different values during the operation of windowing system 800.

The windowed signals are then input into summing block 810 via lines 816. Summing block 810 groups and sums the signals in order to generate the I and Q channels on lines 818, 820. As with the embodiments of FIG. 6 and FIG. 7, the values of window coefficients depend upon the desired shape of the spatial response and the type of window function used to shape the spatial response.

FIGS. 6-8 use four photodetectors to generate one set of I and Q channels. Embodiments in accordance with the invention, however, are not limited to this configuration. One or more spatial filters may include any number of photodetectors that generate a desired number of I and Q channels.

Figure 9:
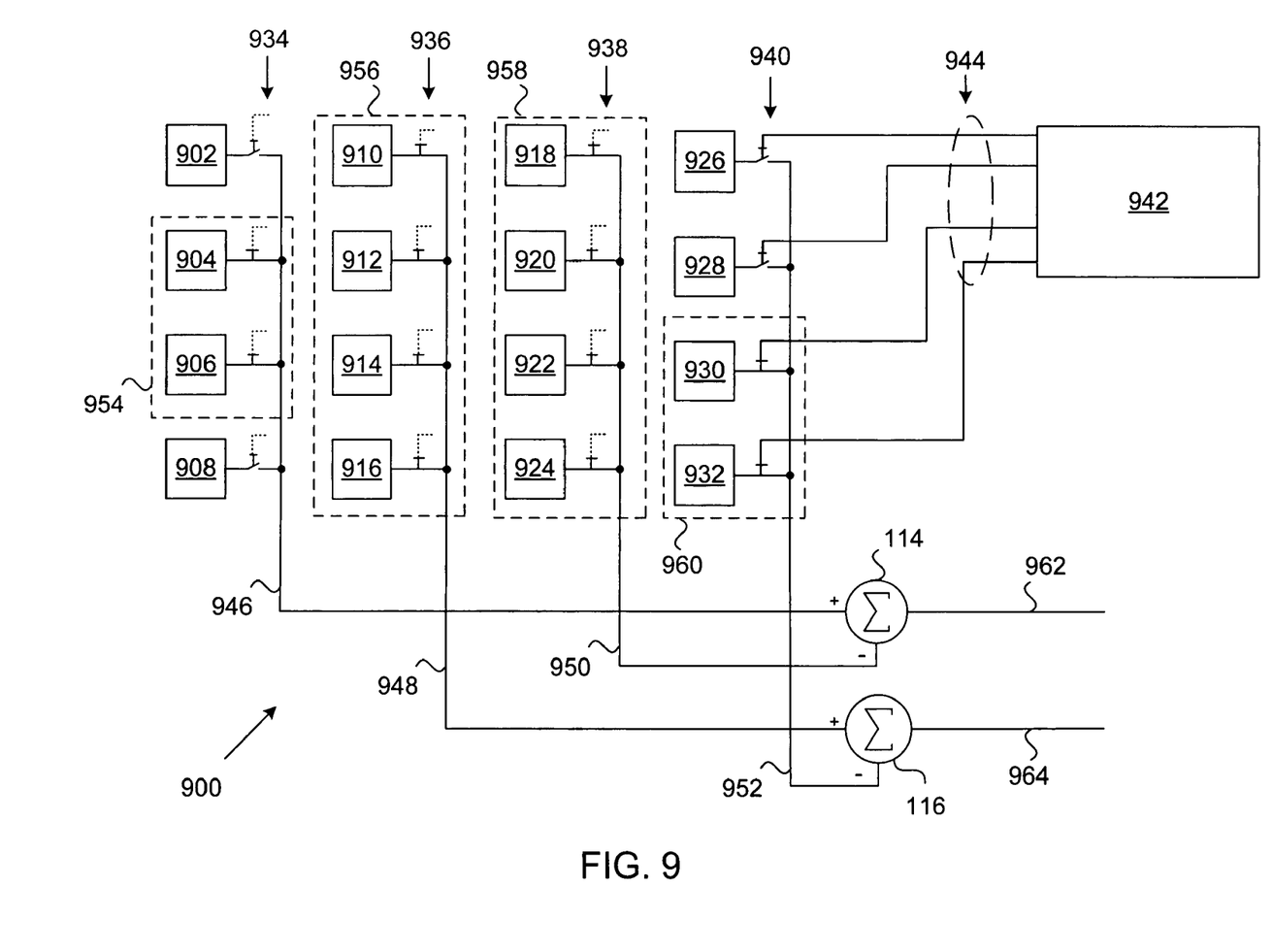
FIG. 9 is a block diagram of second programmable windowing system in an embodiment in accordance with the invention.

Referring to FIG. 9, there is shown a block diagram of second programmable windowing system in an embodiment in accordance with the invention. Programmable windowing system 900 includes an array of discrete photodetectors 902, 904, 906, 908, a second array of discrete photodetectors 910, 912, 914, 916, a third array of discrete photodetectors 918, 920, 922, 924, and a fourth array of discrete photodetectors 926, 928, 930, 932. The four photodetector arrays form a spatial filter that produces an I channel on line 118 and a Q channel on line 120.

An array of switches 934 is connected to photodetectors 902, 904, 906, 908 while a series of switches 936 is connected to photodetectors 910, 912, 914, 916. Similarly, arrays of switches 938, 940 are connected to photodetectors 918, 920, 922, 924 and photodetectors 926, 928, 930, 932, respectively. Controller 942 outputs control signals 944 that control the position of each switch connected to discrete photodetectors 902-932. Although only four control signals 944 are shown in FIG. 9, controller 942 is capable of generating and transmitting a control signal to each switch connected to a discrete photodetector in an embodiment in accordance with the invention.

By opening or closing particular switches, the number of discrete photodetectors used to generate signals 946, 948, 950, 952 is programmable and may be modified during operation of the spatial filter. In the embodiment of FIG. 9, the switches in switch array 934 that are connected to discrete photodetectors 904, 906 are closed. Thus, discrete photodetectors 904, 906 create "effective" photodetector 954 that produces signal 946. The switches in switch array 936, 938 are all closed, thereby allowing discrete photodetectors 910, 912, 914, 916 and discrete photodetectors 918, 920, 922, 924 to form "effective" photodetectors 956, 958, respectively. And effective photodetectors 956, 958 generate signals 948, 950, respectively. And finally, signal 952 is produced by "effective" photodetector 960 that is constructed with discrete photodetectors 930, 932. The number of discrete photodetectors used to create each effective photodetector is determined by a particular window function, where the amount of signal generated by each effective photodetector is proportional to a particular window coefficient.

Signals 946, 950 are input into summing block 114 to produce the I channel on line 962 while signals 948, 952 are input into summing block 116 to produce the Q channel on line 964. Thus, the spatial response of the spatial filter is shaped by the signals generated by particular combinations of discrete photodetectors that are used to create effective photodetectors 954, 956, 958, 960.

Although FIG. 9 depicts four discrete photodetectors in each array, other embodiments in accordance with the invention may include any number of discrete photodetectors in an array. Moreover, each discrete photodetector 902-932 may have the same physical area for detecting light or have areas that are sized independent of each other. And the physical shape of each discrete photodetector included in a spatial filter may assume any desired shape, including, but not limited to, a square, rectangle, and oval.

The invention claimed is:

1. A system, comprising:
a spatial filter comprised of a plurality of photodetectors; and
means for shaping a spatial response of the spatial filter based on an amount of light received by one or more photodetectors in the plurality of photodetectors, wherein the amount of light received by the one or more photodetectors in the plurality of photodetectors differs from an amount of light received by another photodetector in the plurality of photodetectors such that each signal generated by the one or more photodetectors is proportional to a respective window coefficient.

2. The system of claim 1, wherein the means for shaping a spatial response of the spatial filter based on an amount of light received by one or more photodetectors in the plurality of photodetectors comprises means for generating a signal based on an area of a respective photodetector such that the generated signal is proportional to a respective window coefficient.

3. The system of claim 2, wherein an area of the respective photodetector differs from the area of another photodetector as a result of at least one differing dimension.

4. The system of claim 1, wherein the means for shaping a spatial response of the spatial filter based on an amount of light received by one or more photodetectors in the plurality of photodetectors comprises means for blocking Light from striking at least a portion of a surface of one or more photodetectors in the plurality of photodetectors such that each generated signal is proportional to a respective window coefficient.

5. The system of claim 1, wherein the spatial filter comprised of a plurality of photodetectors comprises a spatial filter comprised of a plurality of photodetector arrays wherein each photodetector array includes two or more discrete photodetectors, and wherein the means for shaping a spatial response of the spatial filter comprises means for creating an effective photodetector using each photodetector array such that a signal generated by each effective photodetector is proportional to a respective window coefficient.

6. The system of claim 1, wherein a distance between a pair of photodetectors is different from at least one distance between another pair of photodetectors in the plurality of photodetectors.

7. A system, comprising:
a spatial filter comprised of a plurality of photodetectors;
means for shaping a spatial response of the spatial filter based on an amount of light received by at least one photodetector in the plurality of photodetectors, wherein the amount of light received by the at least one photodetector differs from an amount of light received by another photodetector in the plurality of photodetectors;
a multiplying circuit connected to the output of each photodetector; and
a programming circuit operable to program each multiplying circuit with a window coefficient.

8. The system of claim 7, further comprising an analog-to-digital converter positioned between each photodetector and each multiplying circuit.

9. The system of claim 7, further comprising a memory operable to store the window coefficients.

10. A method for shaping a spatial response of a spatial filter, comprising:
generating a plurality of signals in the time domain; and
windowing the plurality of signals based on an amount of light received by the spatial filter, wherein the amount of light received by the one or more photodetectors in the plurality of photodetectors differs from an amount of light received by another photodetector in the plurality of photodetectors such that each signal generated by the one or more photodetectors is proportional to a respective window coefficient.

11. The method of claim 10, wherein windowing the plurality of signals based on an amount of light received by the spatial filter comprises blocking at least a portion of light received by the one or more of photodetectors in the spatial filter such that each signal generated by each of the one or more photodetectors is proportional to a respective window coefficient.

12. The method of claim 10, wherein windowing the plurality of signals comprises generating the plurality of signals based on an area of each of the plurality of photodetectors in the spatial filter.

13. The method of claim 10, wherein windowing the plurality of signals comprises varying a distance between a pair of photodetectors in the plurality of photodetectors in the spatial filter independent of a distance between another pair of photodetectors in the plurality of photodetectors in the spatial filter.

14. The method of claim 10, wherein
generating a plurality of signals in the time domain comprises generating a plurality of signals with a plurality of effective photodetectors; and
wherein windowing each of the plurality of signals based on an amount of light received by the spatial filter comprises creating each of the plurality of effective photodetectors by enabling one or more discrete photodetectors in a respective photodetector array such that a signal generated by each effective photodetector is proportional to a particular window coefficient.

15. A method for fabricating a spatial filter, comprising:
forming a plurality of photodetectors; and
varying an amount of light that may be received by one or more photodetectors in the plurality of photodetectors such that each signal generated by the one or more photodetectors is proportional to a respective window coefficient.

16. The method of claim 15, wherein varying an amount of light that may be received by one or more photodetectors in the plurality of photodetectors comprises varying at least one dimension of the one or more photodetectors in the plurality of photodetectors.

17. The method of claim 15, wherein varying an amount of light that may be received by one or more photodetectors in the plurality of photodetectors comprises forming a blocking pattern to block at least a portion of the light received by the one or more photodetectors in the plurality of photodetectors.

18. The method of claim 15, wherein
forming a plurality of photodetectors comprises forming a plurality of photodetector arrays including two or more discrete photodetectors;
and wherein
varying an amount of light that may be received by one or more photodetectors comprises creating a plurality of effective photodetectors by enabling one or more discrete photodetectors in each photodetector array such that a signal generated by each effective photodetector is proportional to a particular window coefficient.

* * * * *